United States Patent
De Felice et al.

(10) Patent No.: US 11,079,161 B2
(45) Date of Patent: Aug. 3, 2021

(54) VENTILATION CONTROLLER FOR EQUIPMENT ENCLOSURE

(71) Applicant: Schroff Technologies International, Inc., North Kingstown, RI (US)

(72) Inventors: Richard De Felice, Califon, NJ (US); Robert Paterson, Glasgow (GB); Richard Grundy, Warren, RI (US); Greg MacPherson, Warren, RI (US); Henry Riddoch, Glasgow (GB)

(73) Assignee: Schroff Technologies International, Inc., North Kingston, RI (US)

( * ) Notice: Subject to any disclaimer, the term of this patent is extended or adjusted under 35 U.S.C. 154(b) by 0 days.

(21) Appl. No.: 16/417,878

(22) Filed: May 21, 2019

(65) Prior Publication Data

US 2020/0025435 A1 Jan. 23, 2020

Related U.S. Application Data (63) Continuation-in-part of application No. 15/228,200, filed on Aug. 4, 2016, now Pat. No. 10,670,315.

(60) Provisional application No. 62/200,857, filed on Aug. 4, 2015.

(51) Int. Cl.
| | |
|---|---|
| *F25D 17/06* | (2006.01) |
| *F24F 11/30* | (2018.01) |
| *F25B 13/00* | (2006.01) |
| *F25B 49/02* | (2006.01) |

(52) U.S. Cl.
CPC ............ *F25D 17/067* (2013.01); *F24F 11/30* (2018.01); *F25B 13/00* (2013.01); *F25B 49/02* (2013.01); *F25B 2600/01* (2013.01); *F25B 2600/0251* (2013.01); *F25B 2600/112* (2013.01); *F25B 2700/2104* (2013.01)

(58) Field of Classification Search
CPC ................ F25B 49/02; F25B 2600/112; F25B 2600/0251; F25B 2600/01; F24F 11/50; F24F 11/70; F24F 11/57
See application file for complete search history.

(56) References Cited

U.S. PATENT DOCUMENTS

| | | | |
|---|---|---|---|
| 2,200,477 | A | 5/1940 | Newton |
| 4,676,072 | A | 6/1987 | Higuchi |
| 5,967,761 | A | 10/1999 | Mehaffey |

(Continued)

FOREIGN PATENT DOCUMENTS

| | | | |
|---|---|---|---|
| JP | 2011169559 A | * | 9/2011 |
| JP | 2013083441 A | * | 5/2013 |

OTHER PUBLICATIONS

Hase, Food Refrigerator, Sep. 1, 2011, JP201169559A, Whole Document (Year: 2011).*

(Continued)

*Primary Examiner* — Larry L Furdge
(74) *Attorney, Agent, or Firm* — Armis IP Law, LLC (57) ABSTRACT

A ventilation system maintains a temperature for a computer equipment enclosure using a combination of air conditioning and outside (ambient) air exchange based on a graphical user interface (GUI) for setting a range of temperature at which the ventilation system maintains the temperature. Cooler temperatures allow ambient air exchange to keep the temperature sufficiently low, while air conditioning is invoked when exterior temperatures rise.

9 Claims, 8 Drawing Sheets

(56) References Cited

U.S. PATENT DOCUMENTS

| | | |
|---|---|---|
| 6,419,454 B1 | 7/2002 | Christiansen |
| 2006/0196199 A1 | 9/2006 | Hunt |
| 2014/0063730 A1 | 3/2014 | Hay et al. |

OTHER PUBLICATIONS

Shinya et al., Refrigerating Machine, May 9, 2013, JP2013083441A, Whole Document (Year: 2013).*

* cited by examiner

VENTILATION CONTROLLER FOR EQUIPMENT ENCLOSURE

RELATED APPLICATIONS

This application is a continuation-in-part (CIP) of earlier filed U.S. patent application Ser. No. 15/228,200 entitled "VENTILATION CONTROLLER FOR EQUIPMENT ENCLOSURE," filed on Aug. 4, 2016, which claims the benefit under 35 U.S.C. § 119(e) of U.S. Provisional Patent Application No. 62/200,857 filed Aug. 4, 2015, entitled "OPTIMIZED LEAD-LAG HVAC CONTROLLER FOR EQUIPMENT," incorporated herein by reference in entirety.

BACKGROUND

Computing resources are widely distributed throughout the telecommunications industry. Proliferation of personal electronic devices continues to increase the need for both wireless and wired network connectivity. Modern network deployment requires connectivity hardware, such as cell towers and antennas, in addition to more substantial data centers, to be located throughout a region supported by the network. Each of these locations requires an environmentally controlled enclosure to operate effectively. Further, since the equipment enclosures are typically unstaffed, reliability and longevity of cooling appliances and other HVAC (Heating, Ventilation and Air Conditioning) apparatus is paramount. HVAC demands of these small, specialized machine rooms are particularly specialized and intense due to the small conditioned space and significant heat generation capability of the equipment stored therein.

SUMMARY

An HVAC controller for an equipment enclosure or machine room employs ambient air exchange and compressor driven cooling appliances for maintaining an operating temperature of a telecommunications machine room within acceptable levels. Coordinated engagement of the ambient air exchange and a plurality of lead/lag cooling appliances provides staged engagement of the cooling appliances to correspond to a cooling demand. Designation of lead and lag cooling appliances is alternated according to a designation interval to avoid disproportionate use of individual cooling appliances for promoting longevity. Multiple cooling appliances alternate the lead/lag designation to equalize equipment wear, and alternation of the lead/lag designation follows a normal operational satisfaction of the cooling demand, to minimize a frequency of equipment engagement (power up) cycles which contribute to wear.

Configurations herein are based, in part, on the observation that machine room HVAC controls often rely on analog sensed thermostatic switched control, which simply cycles cooling appliances on and off without any moderation or phased/gradual engagement based on future demands, usage inferences or usage mitigation. Unfortunately, such conventional approaches suffer from the shortcomings of overcooling, excessive cycling leading to degraded equipment lifespan, and wide temperature fluctuations in the environmentally conditioned space. Further, conventional approaches provide no coordination between multiple cooling appliances for leveling usage patterns and ensuring coordinated usage. Typically, separate conventional thermostatic controls are employed which simply burdens the lower set thermostat unit with the bulk of the cooling demand. Accordingly, configurations herein substantially overcome the above described shortcomings by common control of a plurality of cooling appliances in a lead/lag manner coupled with ambient air exchange when conditions dictate. Lead and lag designations alternate to coordinate the engagement of each of the cooling appliances and ensure balanced uptime, promoting longevity and mitigating uneven wear. Lead cooling appliances energize first, followed by lag cooling appliances as needed to maintain the operational temperature, and the designations alternated following a designation period so that the lag cooling appliance becomes the lead cooling appliance in the next designation interval. Larger installations having more cooling appliances rotate the lead appliance and each of the lag appliances in a prioritized manner to ensure equal uptime.

In a particular arrangement depicted below, an environmental control for an equipment enclosure having ambient air exchange and cooling appliances, in which each of the cooling appliances is operable for designation as a lead cooling appliance or a lag cooling appliance, a controller device for maintaining a temperature within the equipment enclosure is configured to commence operation of a lead cooling appliance when an operational temperature inside the equipment enclosure exceeds a predetermined cooling engagement threshold, and commence operation of a lag cooling appliance based on an indication that additional cooling is needed to maintain the operational temperature. Following satisfaction of the additional cooling indication, the controller ceases operation of one of the lead cooling appliance and lag cooling appliance, and alternates the lead and lag designations of the cooling appliances in an iterative manner based on control logic for promoting longevity and minimizing cycles of the cooling appliance.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is a particular configuration of the equipment enclosure and cooling appliances responsive to the controller. Particular cooling appliances are designated as lead or lag appliances, typically controlled by powering a compressor motor powering each cooling appliance. The lead and lag designations alternate, in a substantially equal manner to spread compressor "on" time among the different cooling appliances for promoting equal usage patterns. Multiple lag compressors likewise alternate, or iterate through a priority of the lag compressors and the lead (first priority) compressor. Compressors may also be designated as "lag only" if meant to provide only ancillary support, as opposed to primary cooling.

The lead-lag descriptor is assigned to controllers that operate two or more HVAC systems simultaneously. The control scheme was developed to reduce wear and tear on HVAC units and to allow for staging of units in situations where one or all HVAC(s) has/(have) insufficient capacity to handle peak heat loads or has malfunctioned. The HVAC unit designated as "lead" is switched on first and the others designated as "lag" are then used as supplemental cooling as required. The disclosed lead-lag controller has the ability to manually switch the lead and lag designations as well as time based logic (hardwired or programmed) that swaps through the configured systems. This prevents any single HVAC unit having to bear the bulk of the cooling work and more evenly spreads the compressor on-off cycles amongst the available HVAC units, thereby extending the expected lifespan of all the units in the system. It is the cycling of the compressors that largely determines the effective life of HVAC units.

There are several temperature thresholds or temperature differential thresholds that can be set to trigger the staging of the lag units. For example, if the room temperature is more than 6° F. above the set point, then the second stage is engaged. The second stage then shuts down when the temp gets to within 2° F. of the set point.

Figure 1:
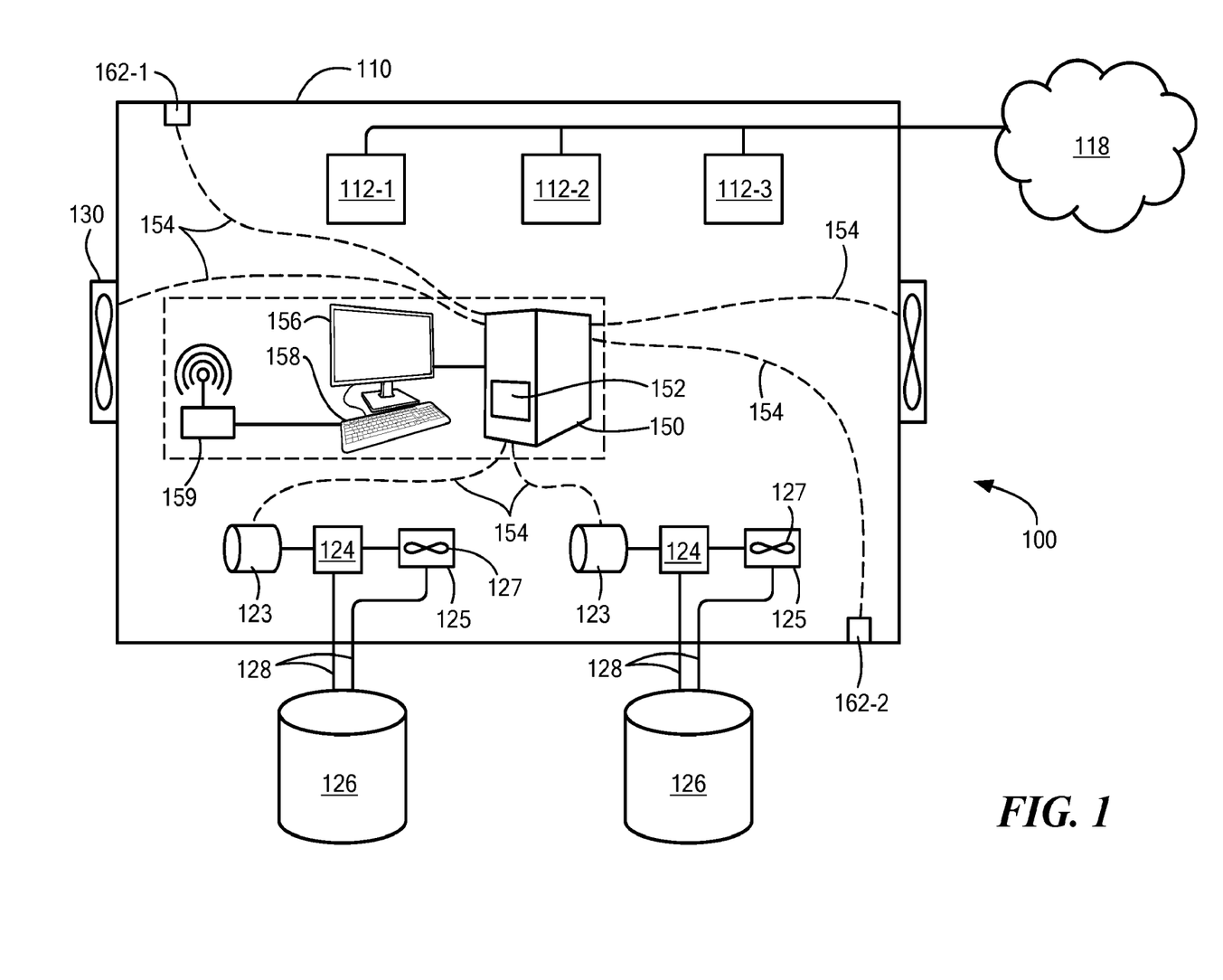
FIG. 1 is a context diagram of a telecommunications environment suitable for use with configurations disclosed herein.

FIG. 1 is a context diagram of a telecommunications environment suitable for use with configurations disclosed herein. Referring to FIG. 1, in a telecommunications environment 100, an equipment enclosure 110 takes the form of a machine room for telecommunications equipment. Telecommunications devices 112-1 . . . 112-3 (112 generally) such as switching and routing equipment includes various processor based computing devices for maintaining information and data throughput throughout a network supported by the telecommunications environment. Generally, it is expected that the telecommunications devices 112 connect to a public access network 118 for facilitating network throughput. Such telecommunications devices 112 generate substantial heat, due to the electronic nature of the devices. Accordingly, the equipment enclosure 110 should be environmentally controlled or the generated heat would quickly rise to unsafe and/or damaging levels.

A plurality of cooling appliances 120-1 . . . 120-2 (120 generally) each include a compressor 124 driven by a motor 123, an evaporator 125 driven by a fan 127 within the enclosure 110 for absorbing heat and a condenser 126 outside the enclosure for venting the heat. Coolant lines 128 circulate refrigerant fluid which changes phase between a liquid and a gas as it flows between the evaporator 125 and condenser 126 for exhausting the heat. A plurality of cooling appliances 120, colloquially referred to as air conditioners, HVAC units, or simply AC, may be employed in the equipment enclosure 110 based on an expected cooling demand produced by the heat generated from the telecommunications devices 112. Any suitable thermal based device may be employed for cooling, however in the example configuration the cooling appliances provide cooling by a phase change of a compressor driven fluid passed between the enclosure and outside air for performing heat transfer from the air inside the electronics enclosure.

An ambient air exchanger 130 may also be invoked to exchange air in the equipment enclosure 110 when outside conditions permit, allowing interior air to exhaust through an exhaust vent 132 or damper. Ambient air exchange is discussed further in copending U.S. patent application Ser. No. 14/946,055, filed Nov. 19, 2015, entitled "VENTILATION CONTROL APPARATUS AND METHOD," and U.S. Pat. No. 10,098,255, issued, Oct. 9, 2018, entitled "VENT CONTROL APPARATUS AND METHOD," both incorporated herein by reference in entirety.

A controller 150 includes control logic 152 for activating the cooling appliances 120 and ambient air exchanger 130 for efficiently maintaining an operating temperature in the equipment enclosure 110 in an optimal range. The controller 150 receives input from sensors 162-1 . . . 162-2, which are configured to sense temperature, humidity and other environmental parameters. Each of the cooling appliances 120 and ambient air exchanger 130 is responsive to the controller 150 via interfaces 154. The controller 150, which may comprise a PC or similar computing unit and processor, includes connections or ports for the interfaces 154 and inputs from the sensors 162. An operator interface including a GUI screen 156 and keyboard 158 or other input device (i.e. mouse, touchscreen, etc.) and communications device 159 such as a WiFi, 4GL or wired connection to an external network such as the Internet is also provided.

Figure 2:
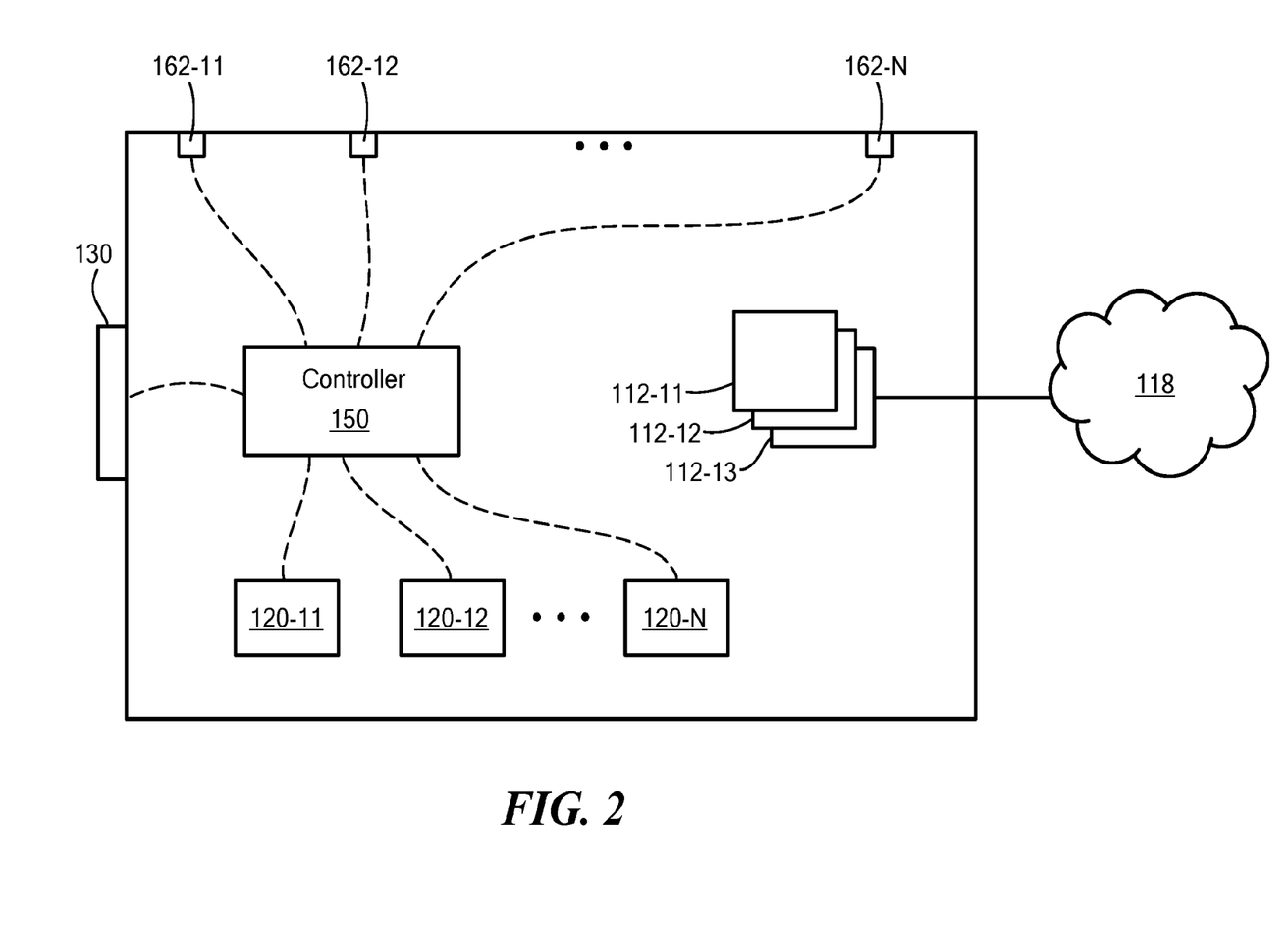
FIG. 2 is a plan view of an equipment enclosure in the environment of FIG. 1.

FIG. 2 is a plan view of an equipment enclosure in the environment of FIG. 1. Referring to FIGS. 1 and 2, the controller 150 is configured to control a plurality of cooling appliances 120 or cooling/heating appliances, and is operable with equipment enclosures 110 of various sizes for housing a broad range of telecommunications devices 112. Such enclosures 110 range in size from several square feet for a small closet enclosure to full machine rooms having raised floors, full height mounting racks and suitable for human occupancy.

Conventional approaches to installation of multiple cooling appliances 120 often utilize separate thermostatic controls for each cooling appliance. Depending on the setting of each thermostat, this can cause one cooling appliance to engage more often, as the unit with the lowest thermostatic setting will detect a call for cooling first. A large discrepancy or other imbalances, such as warm or cold regions of the enclosure, can cause one appliance to bear most of the load with other cooling appliances to remain substantially dormant. This usage pattern causes the pattern of greater use to encounter greater maintenance costs and reduced lifespan. In contrast, the controller 150 is operable to commence a plurality of cooling appliances 120 responsive to the controller 150, such that the cooling appliances 120 are designated as a lead cooling appliance and a prioritized sequence of lag cooling appliances. The controller iteratively assigns the lead/lag designations in a substantially equal apportionment among the lead and lag sequence.

In a generalized configuration, in the equipment enclosure having ambient air exchange and cooling appliances and a controller for maintaining a temperature within the equipment enclosure, a plurality of cooling appliances 120-11 . . . 120-N installed in the equipment enclosure 110 cool (or heat) the environment inside the enclosure to maintain a proper operating temperature. Multiple telecommunications or other devices 112-11 . . . 112-N occupy the enclosure 110 and generate heat that defines a cooling load for the cooling appliances 120. The controller 150 receives input from one or more sensors 162-11 . . . 162-N for controlling the cooling appliances 120. The sensors 162 may comprise thermistors, humidity sensors, smoke or other gaseous detection, and may be located inside or outside the enclosure 110.

Figure 3A:
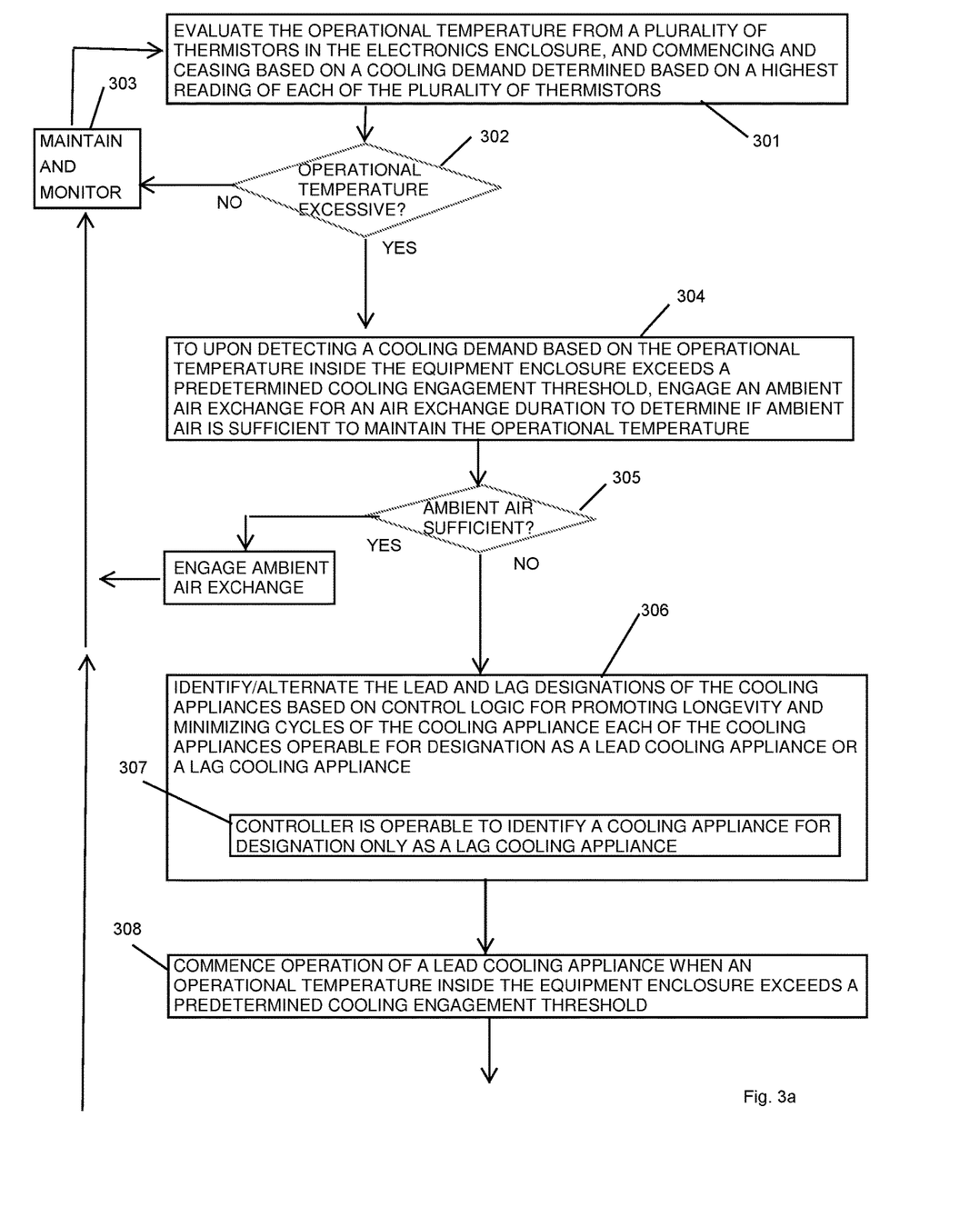
FIGS. 3a-3c are a flowchart of controller device operation in the equipment enclosure of FIG. 2.
Figure 3B:
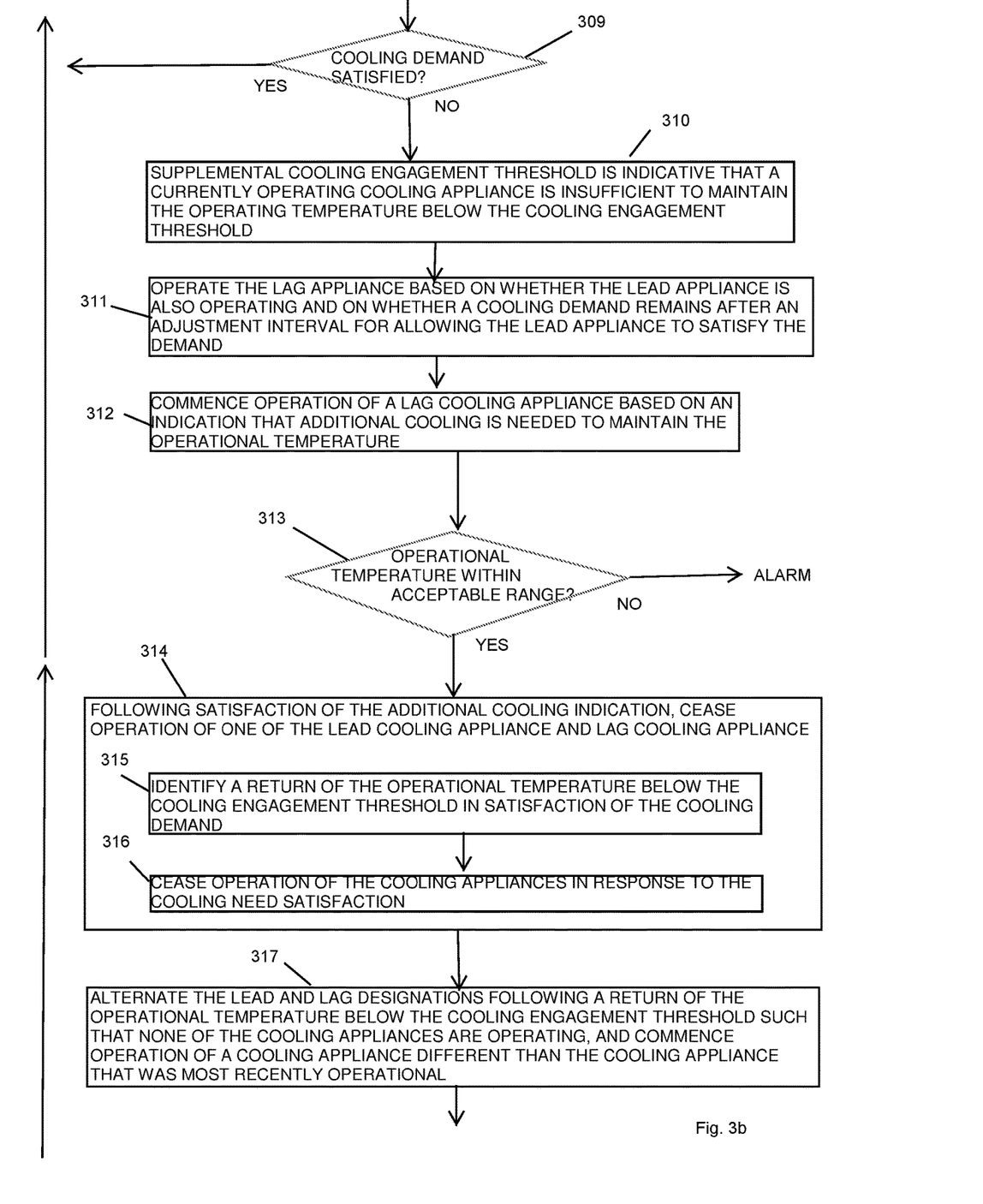
Figure 3C:
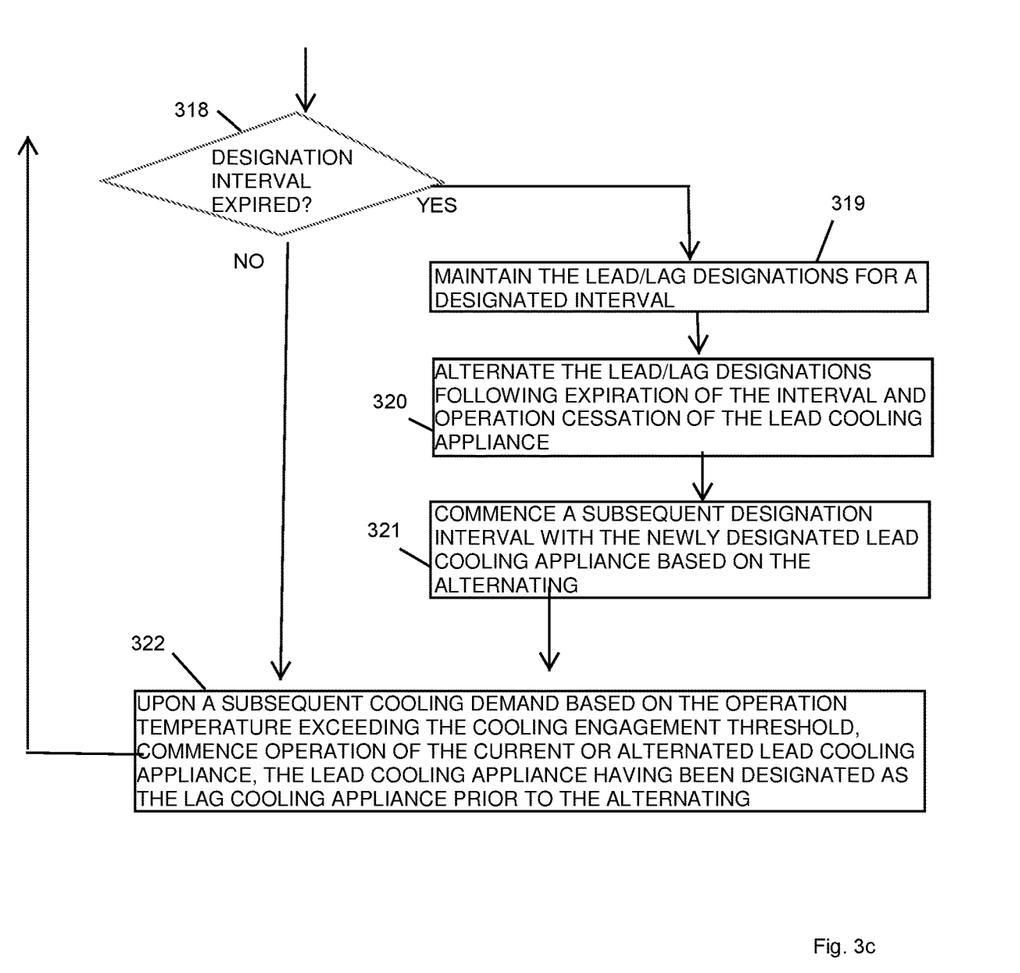

FIGS. 3a-3c are a flowchart of controller device operation in the equipment enclosure 110 of FIG. 2. The disclosed flowchart depicts one example of operation that may be pursued by the controller 150, but is not intended to exhaustively cover all available operating scenarios that the controller 150 may address. Referring to FIGS. 1-3c, the controller is operable to evaluate the operational temperature from a plurality of thermistors in the equipment enclosure 110, and commencing and ceasing based on a cooling demand determined based on a highest reading of each of the plurality of thermistors (sensors) 162, as depicted at step 301. A check is performed, at step 302, to determine if the operating temperature in the equipment enclosure 110 is excessive. If the operating temperature is within acceptable limits, the controller 150 continues monitoring and maintaining the temperature, as depicted at step 303.

At step 304, upon detecting a cooling demand based on the operational temperature inside the equipment enclosure exceeding a predetermined cooling engagement threshold, the controller 150 evaluates and/or engages an ambient air exchanger for an air exchange duration to determine if ambient air is sufficient to maintain the operational temperature. A check is performed, at step 305, to identify when the ambient air exchange is deemed insufficient to maintain the operating temperature. When active cooling is called for, the controller 150 identifies or alternates the lead and lag designations of the cooling appliances based on control logic for promoting longevity and minimizing cycles of the cooling appliance, in which each of the cooling appliances is operable for designation as a lead cooling appliance or a lag cooling appliance, as depicted at step 306. An initial determination of lead/lag cooling appliances is made, followed by redesignation of the lead and lag appliances as discussed further below. Alternately, the controller 150 is operable to identify a cooling appliance 120 for designation only as a lag cooling appliance 120 (step 307), as received from a GUI selection discussed below with respect to FIGS. 4a-4c.

The controller 150 commences operation of a lead cooling appliance when an operational temperature inside the equipment enclosure exceeds a predetermined cooling engagement threshold, as depicted at step 308. A check is performed, at step 309, to determine if the lead compressor has satisfied the cooling demand. If not, an exceeded supplemental cooling engagement threshold is indicative that a currently operating cooling appliance is insufficient to maintain the operating temperature below the cooling engagement threshold, as depicted at step 310. The supplemental cooling threshold represents a differential from the cooling engagement threshold that is variable to allow assessment of cooling load satisfaction by the lead cooling appliance. In general, the indication that additional cooling is needed is based on a difference between the cooling engagement threshold and the supplemental cooling engagement threshold. Additional lag appliances may correspond to other differentials or absolute temperature settings. Therefore, the controller 150 is operable to operate the lag cooling appliance 120 based on whether the lead cooling appliance is also operating and on whether a cooling demand remains after an adjustment interval for allowing the lead appliance to satisfy the demand, as shown at step 311. This is in contrast to conventional separate controls where compressors are switched on based only on a single thermostatic input without regard to the operational state of other compressors operating on the same enclosure. Therefore, the controller 150 commences operation of the lag cooling appliance 120 based on an indication that additional cooling is needed to maintain the operational temperature, as depicted at step 312.

A further check is performed, at step 323, to determine if the operational temperature within acceptable range (following a reasonable delay to allow results of the engaged lag appliance to be effective). If additional lag cooling appliances 120 are needed, they are engaged in order according to a lag priority; if all lag appliances are commenced, there may be an operational fault. An alarm may be triggered, or self-remediation approaches may be first invoked. For example, in the event of a transient icing of coils due to excessive humidity, the controller may receive a pressure indication from a cooling appliance indicative of a pressure abnormality, and/or cease operation of the cooling appliance for an equilibrium interval to allow abatement of overpressure and icing conditions, and permit operation after the equilibrium interval to assess if the pressure anomaly has subsided.

Upon again reaching an acceptable operational temperature, based on satisfaction of the additional cooling indication, the controller ceases operation of one of the lead cooling appliance or the lag cooling appliance, as disclosed at step 314. This includes, at step 315, the control logic 152 identifying a return of the operational temperature below the cooling engagement threshold in satisfaction of the cooling demand, and ceasing operation of one or more of the cooling appliances 120 in response to the cooling need satisfaction, as shown at step 316.

As indicated above, each of the cooling appliances is defined by operation of an evaporator fan and a compressor. The controller 150 is operable to control the evaporator fan 127 and compressor 124 individually. Accordingly, upon ceasing operation of a cooling appliance, the controller 150 disengaging operation of both the evaporator fan 127 and compressor 124 when ceasing operation of the corresponding cooling appliance 120. On the next cooling cycle as the operating temperature rises, upon commencing operation based on the operation temperature, the controller 150 powers the evaporator fan 127 of the most recently operated cooling appliance 120 for extracting residual cooling capacity from the evaporator 125 corresponding to the evaporator fan 127. Cycling operation without compressor operation may suffice to cool the enclosure 110 for considerable time based on the thermal inertia of the most recently operated evaporator.

Following a normal termination of the cooling appliance 120 due to cooling demand satisfaction, the controller 150 is operable to alternate the lead and lag designations following a return of the operational temperature below the cooling engagement threshold such that none of the cooling appliances are operating. Upon the next cooling demand, the controller 150 will commence operation of a cooling appliance different than the cooling appliance that was most recently operational, based on redesignation of a different lead (and lag) cooling appliance, as shown at step 317. Upon a subsequent cooling demand based on the operation temperature exceeding the cooling engagement threshold, the controller will commence operation of the alternated lead cooling appliance, in which the lead cooling appliance had been designated as the lag cooling appliance prior to the alternating.

At step 318, a check is performed to determine if a lead/lag designation interval has expired. Lead/lag intervals may persist for any suitable duration, such as 6, 12 or 24 hours, following which different lead and lag compressors are selected to evenly distribute uptime and which compressor is initially invoked as the "lead." Therefore, the controller 150 maintains the lead/lag designations for a designated interval, as depicted at step 319, and alternates the lead/lag designations following expiration of the interval and operation cessation of the lead cooling appliance 120. This is to avoid prematurely shutting down a compressor merely to satisfy a designation threshold. The current operating cycle is maintained until the controller 150 shuts down the compressor upon cooling load satisfaction. Alternatively, the designation interval may be defined by a number of power on or commenced/engaged cycles when the cooling appliance is called on to provide cooling, rather than a fixed time period. Re designation then proceeds by commencing a subsequent designation interval with the newly designated lead cooling appliance based on the alternating of lead lag compressors, or reordering of the priority of lag compressors following designation of a different lead cooling appliance (compressor). Control then reverts to step 303 to continue monitoring for the next cooling demand.

Figure 4A:
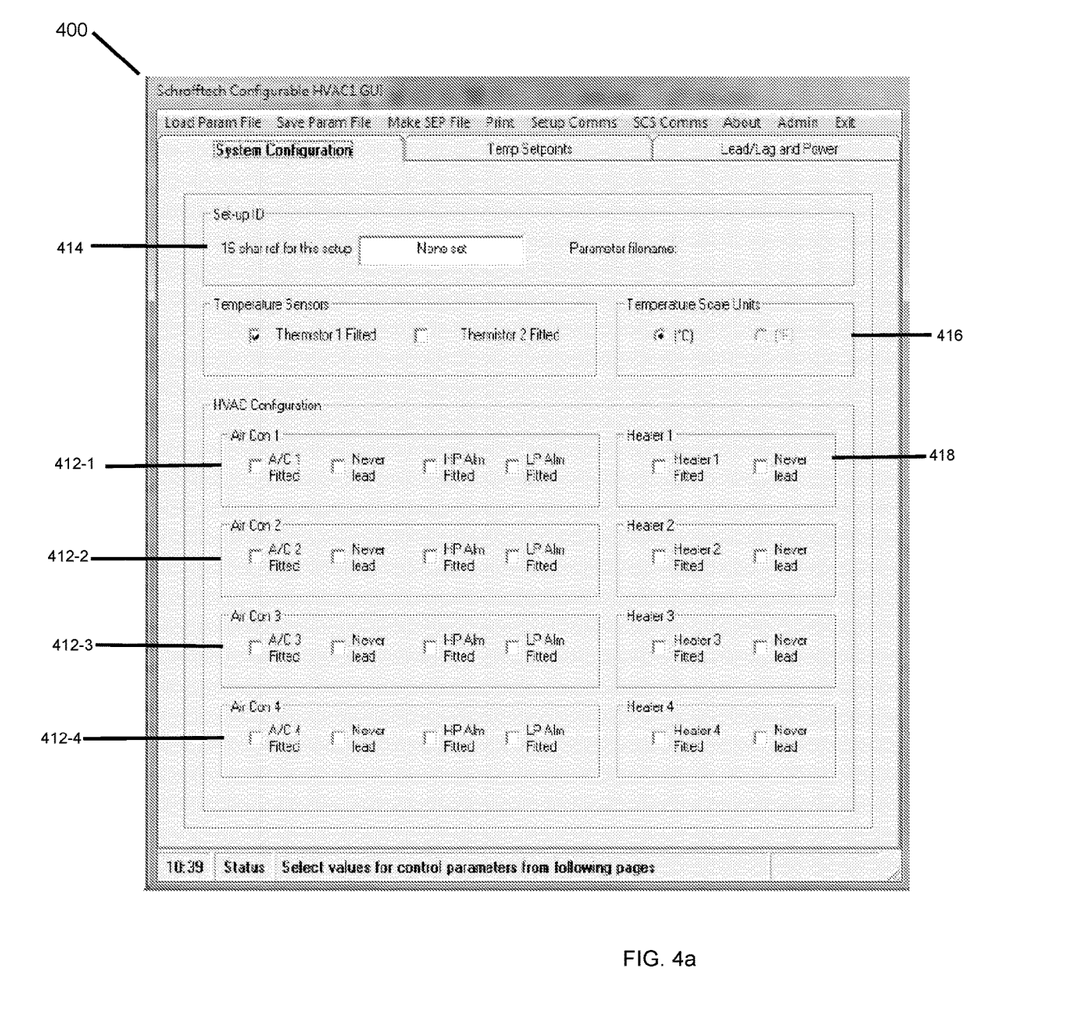
FIGS. 4a-4c are GUI screens for management of the controller device of FIGS. 1 and 2.
Figure 4B:
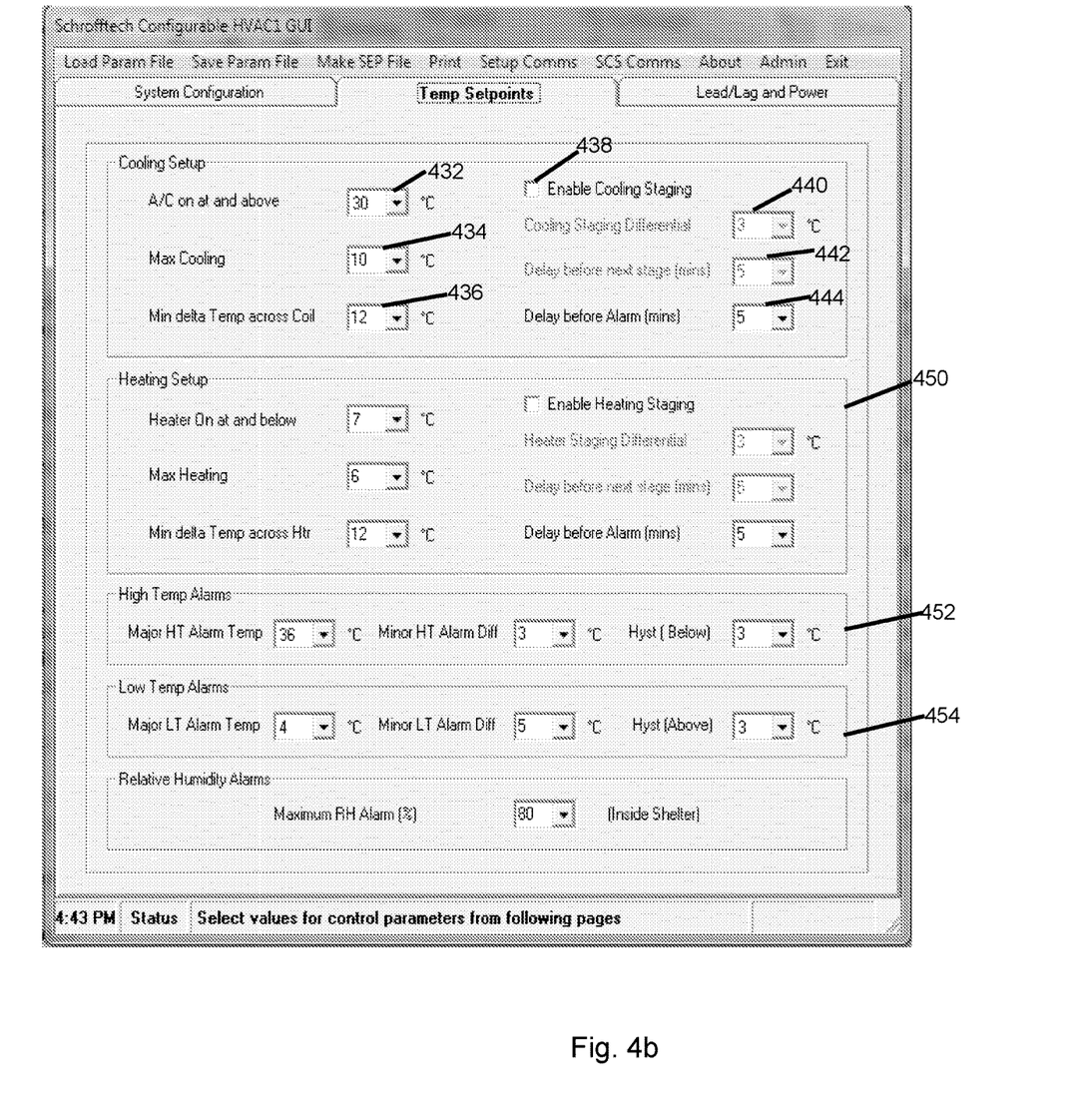
Figure 4C:
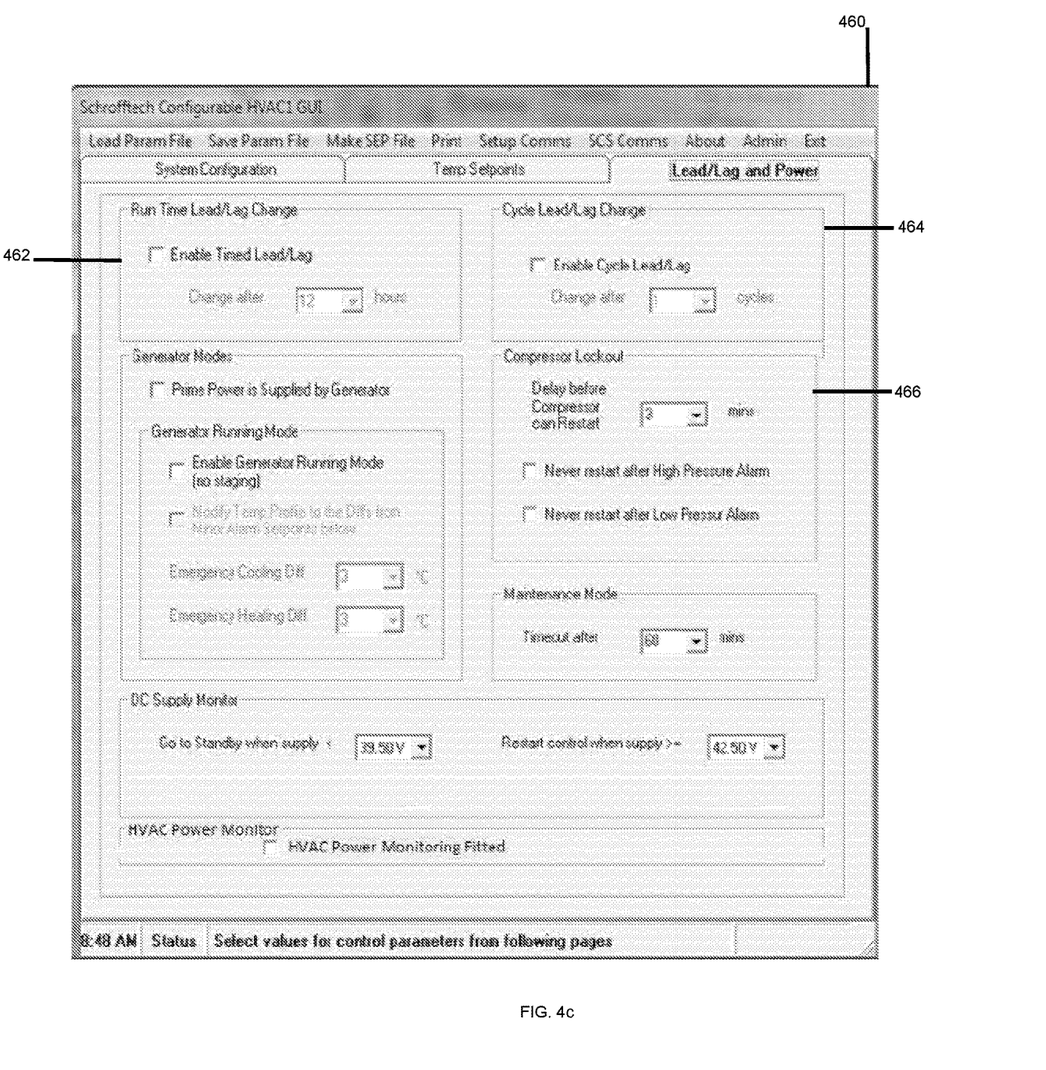

FIGS. 4a-4c are GUI screens for management of the controller device of FIGS. 1 and 2. Referring to FIGS. 1 and 4a, a system configuration screen 410 provides a GUI interface for introducing cooling appliances 120. An air con window 412-1 . . . 412-4 (412 generally) provides entry for each cooling appliance 120. For each window 412, a "fitted" button 420 designates whether the cooling appliance 120 (cooling unit) is installed (attached). A "never lead" button 422 indicates that the cooling appliance 120 should not be selected as the lead appliance, for example due to insufficient cooling ability to handle the entire cooling demand alone. A thermistor configuration window 414 indicates the number of thermistors, or sensors 162, employed. A temperature scale window 416 defines temperature units of F or C degrees, and a heater selection 418 provides similar selection for heating capacity.

Referring to FIGS. 1 and 4b, a setpoint screen 430 provides an "on" setpoint 432 for designating the cooling engagement threshold. A max cooling button 434 defines a cooling operating temperature range as the difference between the cooling engagement threshold (air conditioning on) and the air conditioning off threshold (cooling satisfaction). A max temperature across coil 436 indicates an allowable range across the exchanger/evaporator 125. A staging enable button 438 allows lead lag functionality as disclosed above. A cooling stage differential 440 determines the number of degrees between engagement of successive lag units. For example, a differential of 2 and a cooling engagement threshold of 75 would engage the first lag unit at 77 degrees, the second lag unit at 79, and so on. A stage delay 442 sets a delay before a successive lag unit should be commenced to allow stabilization. An alarm delay sets a delay to allow AC operation to begin dropping the operating temperature before triggering an alarm.

The claimed system recites features in a comprehensive environmental control system that relies upon an integration of temperature control approaches operating in a complementary manner. The combination of the "on" setpoint 432 and max cooling 434 define an extended range of operation for compressor-based cooling. Ambient air exchange serves to reduce runtime of mechanical HVAC when outside conditions permit. Override and takeback timers combine to remedy short term anomalies which may be self correcting and prevent equipment damage for persistent anomalies. The extended range feature, regulates temperature according to a prescribed range rather than an individual setpoint and conventional + or − deviation logic. In addition to the predetermined range that ambient air exchange is based on (vs. mechanical HVAC compressors), the extended range allows definition of a range, rather than a single setpoint (or setpoint with variance).

The benefit of the extended range is based on the observation that machines, unlike people, tolerate a much greater range of temperature than human inhabited spaces. Accordingly, machine rooms need not cool to a single valued setpoint (with or without a tolerance). Machine and equipment rooms may provide cooling to the extended range between multiple setpoints without unduly burdening the equipment. HVAC operation may be performed by powering on at a first set point, and deenergizing at a second, lower set point, thus reducing the frequency and number of on/off cycles endured by the equipment. In other words, once engaged, the HVAC may cool not just back to the setpoint and/or tolerance, but may continue cooling to a maximum cooling defined by the low set point expressed by the max cooling parameter 434.

A heating setup window 450 provides similar controls for heating apparatus (heating apparatus may not be required in some climates, as overheating of the environment is a primary focus of the environmental controls, however heating controls may be implemented using similar control logic). A high temperature alarm window 542 sets thresholds for high temperature alarms, and a low temperature alarm window 454 defines low temperature alarms.

Referring to FIG. 4c, a lead/lag selection screen 460 refines the designation interval. A run time window 462 allows a designation interval based on a time interval, such as 6, 12 or 24 hours. A run cycle selection window 464 defines a number of on/off cycles in each designation interval. A compressor lockout window 466 allows detection of compressor freeze-up and/or pressure anomalies.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an environmentally controlled space for housing electronic equipment between temperature ranges defined by an activation threshold for enabling HVAC equipment and a satisfaction threshold for disabling HVAC equipment, a method of controlling the HVAC equipment comprising:
receiving an engagement threshold defining engagement of environmental conditioning equipment for satisfying an environmental conditioning demand;
determining a satisfaction threshold indicative of satisfaction of the environmental conditioning demand, further comprising
receiving a parameter indicative of an extended range value; and
computing the satisfaction threshold from a difference of the engagement threshold and the extended range value;
energizing the environmental conditioning equipment by powering on when the temperature in the equipment space reaches the engagement threshold; and
deenergizing the environmental conditioning equipment by powering off when the temperature in the enclosure reaches the satisfaction threshold, the satisfaction threshold being different than the engagement threshold for incurring a longer interval during which the environmental conditioning equipment is operating, the difference between the engagement threshold and the satisfaction threshold defining an extended range of operation through which the HVAC equipment operates subsequent to attaining the engagement threshold, the extended range defining a temperature range through which conditioning equipment remains continuously operational or idle.

2. The method of claim 1 wherein the HVAC equipment includes refrigeration compressors and the engagement threshold defines a higher temperature than the satisfaction threshold.

3. The method of claim 1 wherein the HVAC equipment includes heating equipment and the engagement threshold defines a lower temperature than the satisfaction threshold.

4. The method of claim 1 further comprising:
rendering a graphical user interface (GUI) for receiving user selectable values indicative of the engagement threshold;
receiving the parameter indicative of the extended range value from the GUI; and
computing the satisfaction threshold from a difference of the engagement threshold and the extended range value.

5. The method of claim 2 wherein the HVAC equipment includes a plurality of cooling appliances, further comprising:
commencing operation of a lead cooling appliance when an operational temperature inside the equipment enclosure exceeds a predetermined cooling engagement threshold;
commencing operation of a lag cooling appliance based on an indication that additional cooling is needed to maintain the operational temperature;
following satisfaction of the additional cooling indication, ceasing operation of one of the lead cooling appliance and lag cooling appliance; and
alternate the lead and lag designations of the cooling appliances based on control logic for promoting longevity and minimizing cycles of the cooling appliance.

6. The method of claim 1 further comprising receiving at least one of the engagement threshold and the satisfaction threshold as a relative value from a temperature.

7. The method of claim 1 wherein the received engagement threshold is received as a value on a GUI (Graphical User Interface) entry item for an absolute temperature value, and the satisfaction threshold is received as a value on a GUI entry item for maximum cooling relative to the engagement threshold.

8. The method of claim 1 wherein a difference between the engagement threshold and satisfaction threshold define an extended range based on acceptable temperature ranges for equipment in the environmentally controlled space.

9. The method of claim 8 further comprising:
energizing the environmental conditioning equipment when the temperature in the equipment space exceeds the engagement threshold;
identifying a return of the temperature in the equipment space to the engagement threshold; and
continuing operating the environmental conditioning equipment until the temperature has risen or fallen by the difference or has reached the satisfaction threshold based on the extended range value.

* * * * *